United States Patent [19]

Sugimoto et al.

[11] Patent Number: 4,678,980
[45] Date of Patent: Jul. 7, 1987

[54] POWER FAILURE STOP CIRCUIT FOR A CONVERTER

[75] Inventors: Shigeyuki Sugimoto; Masayuki Kato; Katsuhiko Chonan, all of Nagoya, Japan

[73] Assignee: Mitsubishi Denki Kabushiki Kaisha, Tokyo, Japan

[21] Appl. No.: 923,543

[22] Filed: Oct. 27, 1986

[30] Foreign Application Priority Data

Oct. 31, 1985 [JP] Japan ................................ 60-244613

[51] Int. Cl.4 ............................................. H02P 3/18
[52] U.S. Cl. .................................. 318/759; 318/762; 318/803; 318/811
[58] Field of Search ................... 363/37, 50; 318/762, 318/760, 759, 803, 811; 361/33, 23

[56] References Cited

U.S. PATENT DOCUMENTS 4,445,167  4/1984  Okado ................................. 318/811
4,506,766  3/1985  Watanabe ............................ 363/37
4,620,296 10/1986  Siemon ................................ 363/37

FOREIGN PATENT DOCUMENTS 34311  3/1977  Japan .................................. 318/759
34312  3/1977  Japan .................................. 318/759

Primary Examiner—William H. Beha, Jr.
Attorney, Agent, or Firm—Sughrue, Mion, Zinn, Macpeak and Seas

[57] ABSTRACT

The voltage in a converter 20 is compared with a reference voltage to detect an input power failure, in response to which a motor driven by the converter is automatically decelerated in accordance with a stored signal pattern/speed reduction curve such that the energy regenerated by the motor is equal to its power consumption. The DC bus voltage of the converter is thus maintained substantially constant during the regenerative braking of the motor, and it is promptly halted without resort to any mechanical braking unit.

5 Claims, 5 Drawing Figures

POWER FAILURE STOP CIRCUIT FOR A CONVERTER

BACKGROUND OF THE INVENTION

The present invention relates to a converter control circuit for stopping a motor as promptly as possible in the event of a power failure.

A conventional power failure stop circuit for a converter is shown in FIG. 1, wherein a converter 20 includes a power rectifier unit 1 for converting three phase AC voltage into a pulsating unidirectional voltage, a smoothing condenser 2 for obtaining a DC voltage from the pulsating voltage, and a power inverter unit 3 for inverting the DC voltage into an AC signal of variable voltage and variable frequency. An induction motor 4 is driven and speed-controlled by the power inverter unit 3. A voltage detection circuit 5 detects the DC bus voltage of the power inverter unit 3 and outputs a proportional, reduced voltage signal to a comparator 7 described hereinafter. Reference numeral 6 indicates a rheostat or the like for setting a reference voltage level to judge whether or not a power failure has occurred.

The comparator 7 compares the DC bus voltage signal from the voltage detection circuit 5 with the reference voltage signal from the rheostat 6, and outputs a power failure signal a when the DC bus voltage signal becomes lower than the reference voltage signal.

A holding circuit or latch 8 retains the status of the power failure signal a after it is inputted, and outputs a power failure signal b. An operation mode decision circuit 9 determines the operation mode such as acceleration, normal, and deceleration by comparing the target speed command $f_i$ (desired) with the output frequency command $f_o$ (actual-input not shown). An output frequency command decision circuit 10 sets the frequency command to be outputted on the basis of the mode established by the circuit 9. A PWM signal generation circuit 11 generates a Pulse Width Modulation signal from the output frequency command $f_o$ and outputs it to a PWM signal cut-off circuit 12, which blocks the PWM signal from the circuit 11 only when a power failure signal b is present. A driving circuit 13 for the power inverter unit 3 switches the transistors or thyristors therein ON/OFF in accordance with the PWM signal. A mechanical brake unit 14 applies braking power to the motor 4 only when the power failure signal b from the holding circuit 8 is present.

Under normal operation conditions, the decision circuit 9 commands the acceleration mode when $f_o < f_i$, the normal mode when $f_o = f_i$, and the deceleration mode when $f_o > f_i$. The circuit 10 calculates the frequency command $f_o$ corresponding to the commanded mode pattern and on the basis thereof the PWM signal generation circuit 11 calculates the PWM signal and outputs it to the cut-off circuit 12. Absent a power failure signal b the driving circuit 13 switches the power inverter unit elements according to the PWM signal.

If the input power source fails, however, the comparator 7 outputs the power failure signal a and the holding circuit 8 outputs a latched power failure signal b. The cut-off circuit 12 then blocks the PWM signal from the circuit 11, which attendantly cuts off the output of the driving circuit 13. The motor 4 thus becomes free-running, and it would take a considerable time to stop when its inertial load force ($GD^2$) is large. If the motor 4 is controlling a working machine stroke, for example, a dangerous condition could result. The motor is thus equipped with a mechanical brake unit 14, which effectively and abruptly stops it when the power failure signal b is generated.

SUMMARY OF THE INVENTION

An object of this invention is to provide a power failure stop circuit for a converter wherein no mechanical brake unit is required, and the motor is abruptly stopped in the event of a power failure by automatically implementing a deceleration/regenertive braking mode of operation in accordance with a predetermined signal pattern which matches the regenerative power with the power consumption level of the motor to thereby maintain the DC bus voltage constant.

DETAILED DESCRIPTION OF THE PREFERRED EMBODIMENT

Figure 1:
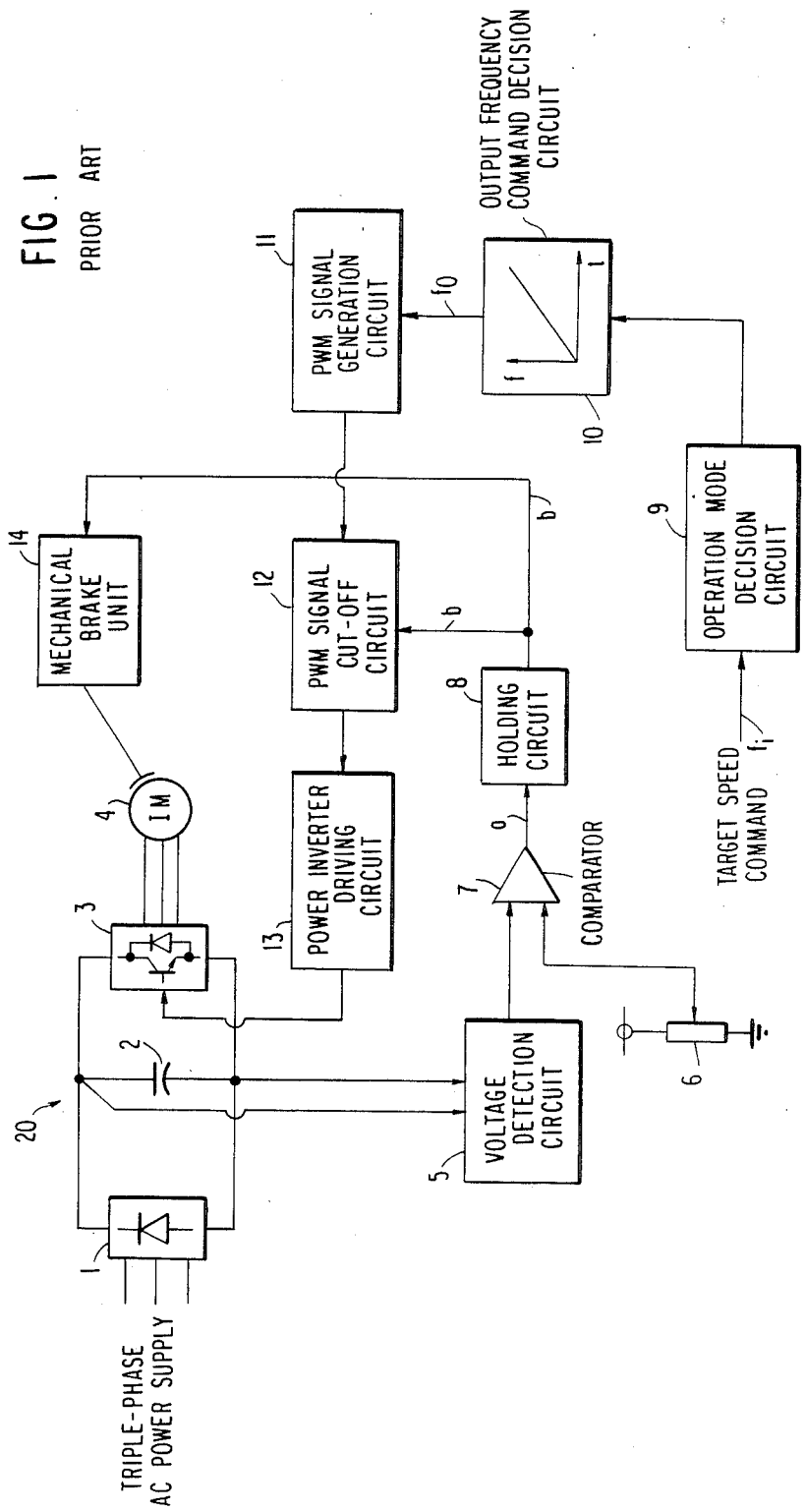
FIG. 1 is a circuit block diagram of a conventional power failure stop circuit for a converter.
Figure 2:
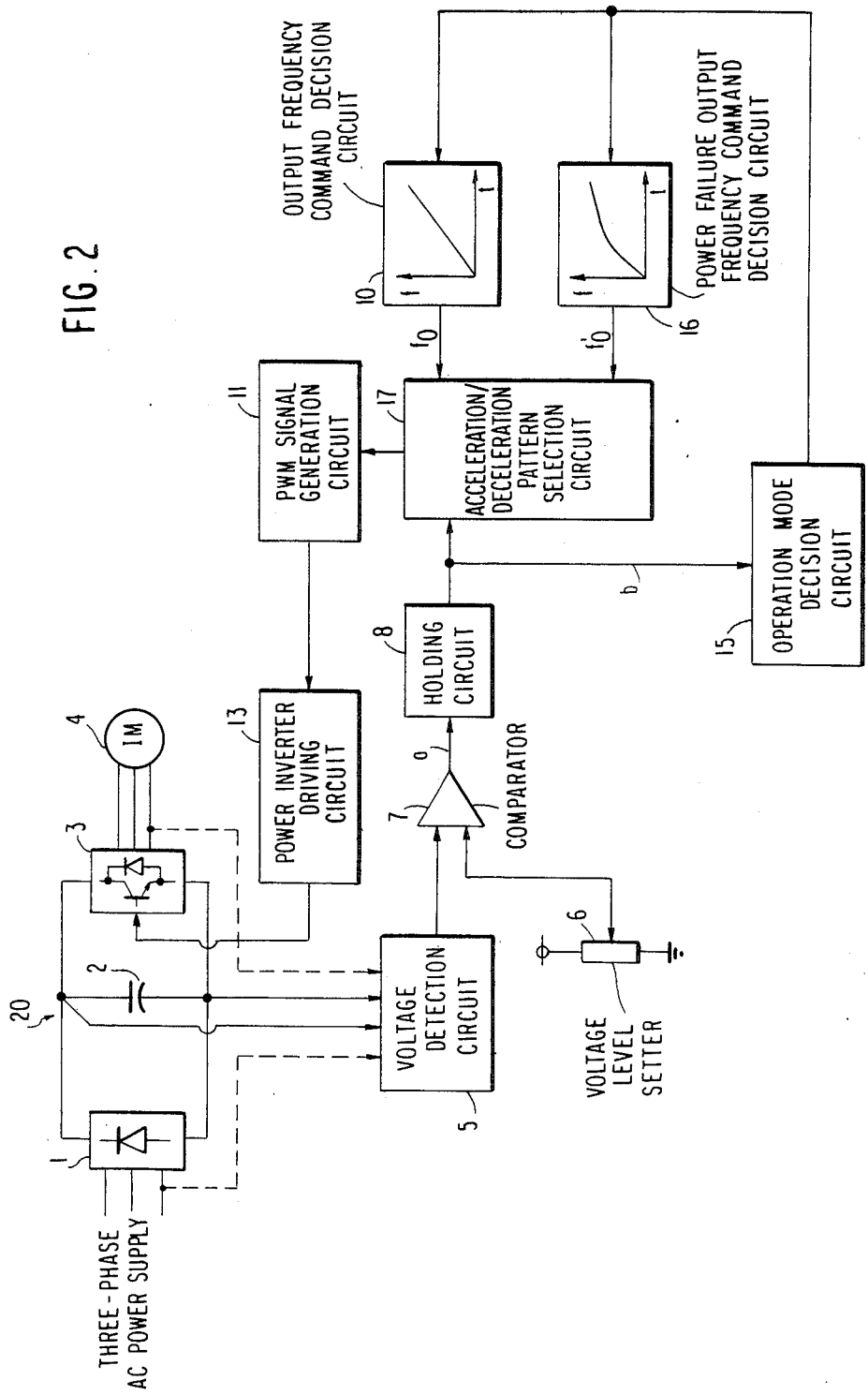
FIG. 2 is a circuit block diagram of a power failure stop circuit for a converter in accordance with an embodiment of the present invention.

In the following description of a preferred embodiment of the invention, the common components shown in FIG. 1 are assigned the same reference numerals in FIG. 2 and their explanation is omitted.

Reference numeral 15 indicates an operation mode decision circuit which determines the acceleration, normal, and deceleration modes by comparison as before, but which outputs a deceleration mode signal irrespective of the true operation mode whenever a power failure signal b is present. Reference numeral 16 indicates a power failure output frequency command decision circuit which contains internally a deceleration pattern exclusively for power failure situations.

Reference numeral 17 indicates an acceleration/deceleration pattern selection circuit which selects the output frequency command $f_o$ from the ordinary output frequency decision circuit 10 when no power failure signal b is present, and the output frequency command $f_o$ from the circuit 16 when the power failure signal b is present.

Figure 4:
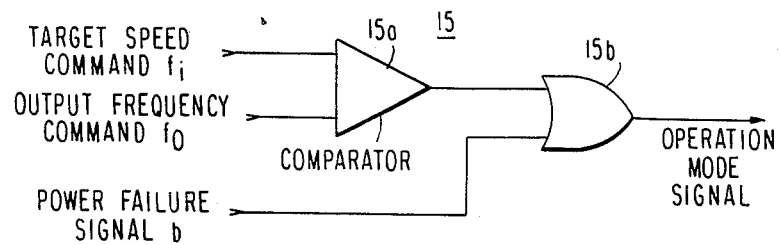
FIG. 4 is a block diagram of the operation mode decision circuit of the invention.

An embodiment of the operation mode decision circuit 15 is shown in FIG. 4, and comprises a comparator 15a and an OR gate 15b. The comparator 15a receives a target speed command fset by the user through an external sequence circuit or the like and an output frequency command $f_o$ selected by the acceleration/deceleration circuit 17, and outputs a deceleration or an acceleration mode signal. The OR gate 15b overrides the output from the comparator 15a, and outputs a deceleration mode signal whenever the power failure signal b is received.

Figure 5:
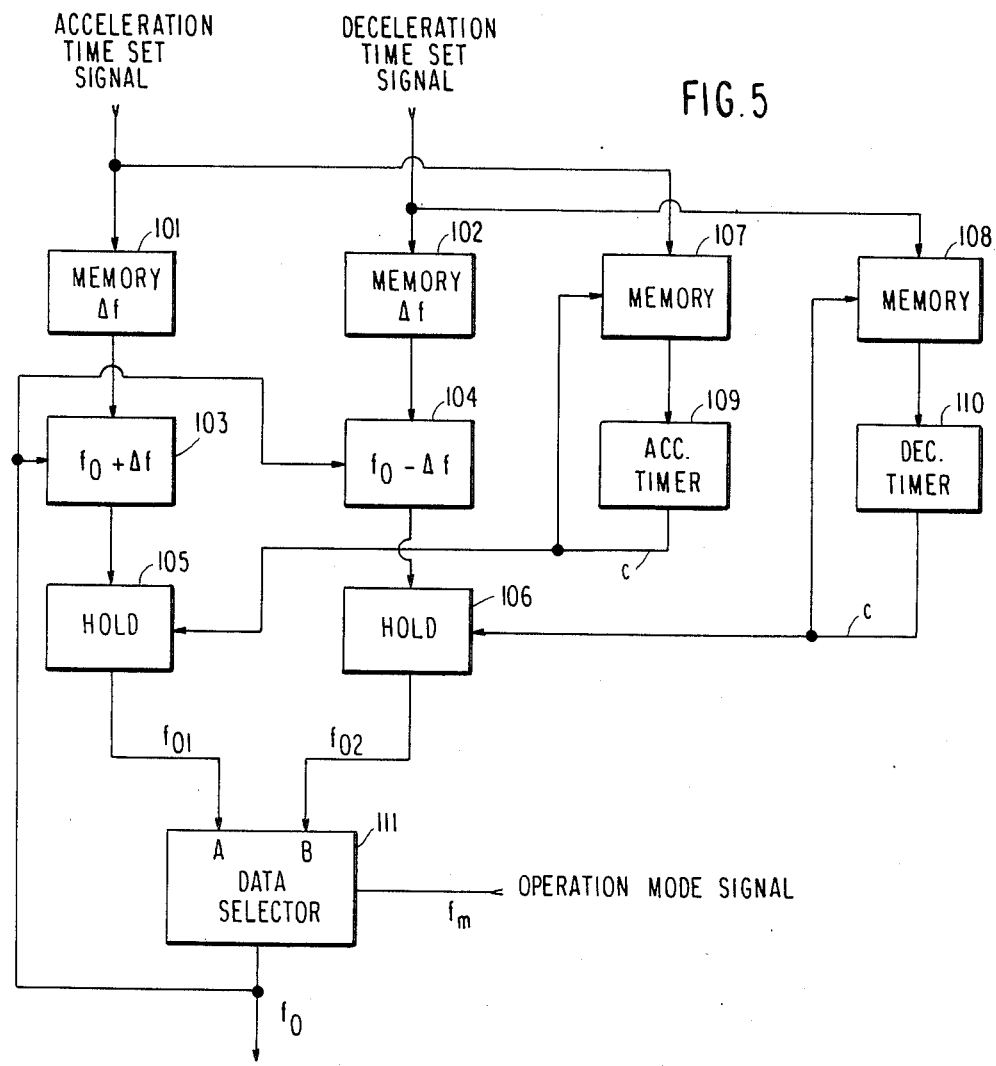
FIG. 5 is a block diagram of the output frequency decision circuit of the invention.

FIG. 5 shows an embodiment of the output frequency decision circuit 10, wherein memories 101, 102 store data to be added to or subtracted from the output frequency command $f_o$, and output them according to the acceleration or deceleration time signals set by the user. Memories 107, 108 store data regarding timer setting values for an acceleration timer 109 and a deceleration timer 110, and output them when a carry signal c is received from the timers. Hold circuits 105, 106 retain output frequency commands from the adder 103 and the subtractor 104, and output them in response to the carry signal c. A data selector 111 selectively outputs the frequency command $f_{o1}$ from the hold circuit 105 or the frequency command $f_{o2}$ from the hold circuit 106 according to the operation mode signal $f_m$. The $f_{o1}$ frequency command is outputted when the operation mode signal $f_m$ specifies acceleration, and the $f_{o2}$ frequency command is outputted when the operation mode signal $f_m$ specifies deceleration.

The power failure output frequency decision circuit 16 is the same as the decision circuit 10 except that its memories 101, 102 and 107, 108 all store deceleration pattern data so that the regeneration power at the time of a power failure becomes constant.

In operation, under normal conditions the decision circuit 15 determines an acceleration mode when $f_o < f_i$, a stationary mode when $f_o = f_i$ and a deceleration mode when $f_o > f_i$, and outputs its command to the decision circuit 10 which calculates the frequency command $f_o$ corresponding to the set and stored acceleration/deceleration patterns and the like and outputs it, via circuit 17, to the PWM signal generation circuit 11 to control the synchronous rotation of the induction motor 4 as described above.

Figure 3:
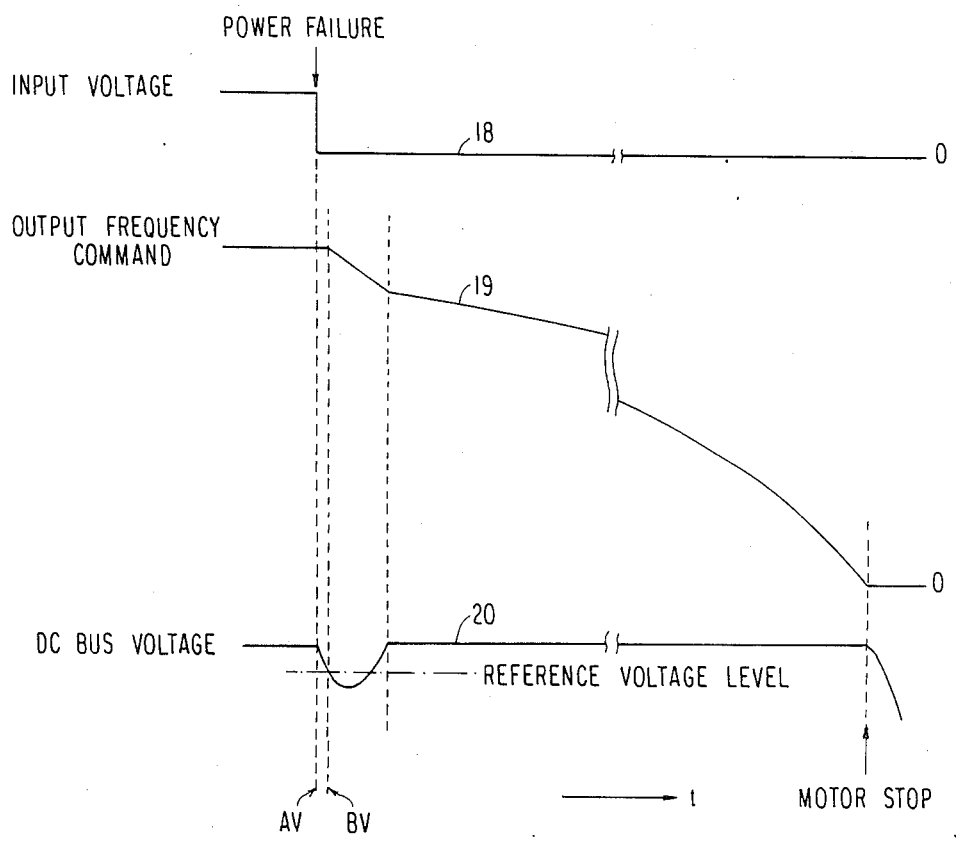
FIG. 3 is a diagram showing the relationship among the input voltage, the output frequency, and the DC bus voltage of the converter according to the invention, following a power failure.

Referring next to FIG. 3, which shows the input voltage 18 of the converter, the output frequency command 19 and the DC bus voltage 20, when a power failure occurs at time AV in the drawing the DC bus voltage 20 starts to decrease in accordance with the time constants of the circuit connected thereto. When the DC bus voltage becomes lower than the reference voltage level at time BV, the power failure signal a is outputted from the comparator 7 as described previously, and is latched by the holding circuit 8 and outputted as the power failure signal b. When the signal b is received by the operation mode decision circuit 15 and the acceleration/deceleration pattern selection circuit 17, the deceleration mode signal is outputted from the mode decision circuit 15, and at the same time, the selection circuit 17 selects the output frequency command from the power failure frequency decision circuit 16 and supplies it to the PWM signal generation circuit 11. As the result the output frequency command signal 19 starts to decrease following the deceleration pattern exclusively established for power failures from time BV. As the motor 4 correspondingly decelerates, electric power is regenerated thereby and fed back to the converter 20; the DC bus voltage is thus prevented from lowering further. Moreover, since the regenerated electrical energy is related to the deceleration time (the shorter the deceleration time, the greater the regenerated energy), it is possible to adjust the regenerated energy by appropriately setting the deceleration pattern. Accordingly, if a deceleration pattern is used in the power failure output frequency decision circuit 16 that results in almost equal power consumption by the motor and energy regenerated thereby, it is possible to maintain the DC bus voltage 20 substantially constant as shown in FIG. 3 even following a power failure, and to continue the deceleration until the output frequency command becomes zero, i.e., until the induction motor 4 comes to a complete stop.

In the above embodiment the DC bus voltage is used to detect a power failure. However, the voltage of one phase of the AC power supply or the peak voltage value of one phase of the power inverter unit output may also be used for this purpose. Further, although only one type of deceleration pattern exclusively for power failure has been shown, several such deceleration patterns may be provided to enable a selection depending on the load conditions of the inverter unit.

What is claimed is:

1. A power failure stop circuit for a converter (20) including a power rectifier unit (1) and a power inverter unit (3), comprising:
   (a) a voltage detection circuit (5) for detecting an operating voltage in said converter;
   (b) a voltage level setter (6) for establishing a reference voltage signal;
   (c) a comparator (7) for comparing the reference voltage signal with the converter operating voltage, and for outputting a power failure signal when said operating voltage becomes lower than said reference voltage;
   (d) an operation mode decision circuit (15) for comparing a target speed command ($f_i$) with an output frequency command ($f_o$) to determine a normal operating mode for said converter and for outputting an overriding deceleration mode signal irrespective of the normal operating mode at the time of a power failure;
   (e) an output frequency command decision circuit (10) for generating a first frequency command in accordance with said normal operating mode determination;
   (f) a power failure output frequency command decision circuit (16) for generating a second frequency command in accordance with an internally stored deceleration pattern established exclusively for power failures in response to an overriding deceleration mode signal from the operation mode decision circuit;
   (g) an acceleration/deceleration pattern selection circuit (17) for selecting the first frequency command from the output frequency command decision circuit when no power failure signal is present, and the second frequency command from the power failure output frequency command decision circuit when a power failure signal is present;
   (h) a PWM signal generation circuit (11) responsive to a frequency command selected by the acceleration/deceleration pattern selection circuit for generating a converter control signal; and
   (i) a driving circuit (13) for switching power inverter unit elements to control a motor speed in accordance with the control signal from the PWM signal generation circuit such that a deceleration mode is automatically implemented in the event of a power failure to regeneratively brake the motor.

2. The circuit of claim 1, wherein said power failure signal is inputted to the operation mode decision circuit (15) and to the acceleration/deceleration pattern selection circuit (17) via a holding circuit (8), whereby an overriding deceleration mode signal is outputted from the operation mode decision circuit, and the acceleration/deceleration pattern selection circuit selects the second frequency command and outputs it to the PWM signal generation circuit (11).

3. The circuit of claim 1, wherein the regenerative braking power from the motor is adjusted by the stored deceleration pattern such that the regenerative power and the motor power consumption become equal when a power failure is detected.

4. The circuit of claim 1, wherein said voltage detection circuit (5) detects an input voltage to the power rectifier unit (1) of the converter.

5. The circuit of claim 1, wherein said voltage detection circuit (5) detects an output voltage from said power inverter unit (3) of the converter.

* * * * *